(12) United States Patent
Hu et al.

(10) Patent No.: US 8,161,028 B2
(45) Date of Patent: Apr. 17, 2012

(54) SYSTEM AND METHOD FOR ADAPTIVE CATEGORIZATION FOR USE WITH DYNAMIC TAXONOMIES

(75) Inventors: Jianying Hu, Bronx, NY (US); Aleksandra Mojsilovic, New York, NY (US); Moninder Singh, Farmington, CT (US)

(73) Assignee: International Business Machines Corporation, Armonk, NY (US)

( * ) Notice: Subject to any disclaimer, the term of this patent is extended or adjusted under 35 U.S.C. 154(b) by 679 days.

(21) Appl. No.: 12/315,724

(22) Filed: Dec. 5, 2008

(65) Prior Publication Data

US 2010/0145961 A1    Jun. 10, 2010

(51) Int. Cl.
   *G06F 17/30* (2006.01)
(52) U.S. Cl. ........ 707/706; 707/737; 707/738; 707/740; 707/749; 707/750; 707/751; 707/752; 707/754; 707/763; 707/771
(58) Field of Classification Search .................. 707/706, 707/737, 738, 740, 749, 750, 751, 752, 754, 707/763, 771
See application file for complete search history.

(56) References Cited

U.S. PATENT DOCUMENTS

| | | | | |
|---|---|---|---|---|
| 6,012,058 A * | 1/2000 | Fayyad et al. | ............... | 1/1 |
| 6,920,448 B2 * | 7/2005 | Kincaid et al. | ............... | 1/1 |
| 6,944,607 B1 * | 9/2005 | Zhang et al. | .................. | 707/737 |
| 7,174,343 B2 * | 2/2007 | Campos et al. | ............... | 707/737 |
| 7,430,717 B1 * | 9/2008 | Spangler | ....................... | 707/737 |
| 7,734,629 B2 * | 6/2010 | Chakrabarti et al. | ......... | 707/740 |
| 7,743,059 B2 * | 6/2010 | Chan et al. | ..................... | 707/737 |
| 7,809,726 B2 * | 10/2010 | Flanagan | ....................... | 707/737 |
| 7,873,643 B2 * | 1/2011 | Hadzikadic et al. | .......... | 707/751 |
| 8,019,766 B2 * | 9/2011 | Chan et al. | ..................... | 707/740 |
| 2002/0169764 A1 * | 11/2002 | Kincaid et al. | ..................... | 707/3 |
| 2003/0158867 A1 * | 8/2003 | Goodwin et al. | ............. | 707/200 |
| 2005/0234955 A1 * | 10/2005 | Zeng et al. | ..................... | 707/101 |
| 2007/0271265 A1 * | 11/2007 | Acharya et al. | ..................... | 707/6 |
| 2007/0271287 A1 * | 11/2007 | Acharya et al. | ............... | 707/101 |
| 2007/0271292 A1 * | 11/2007 | Acharya et al. | ............... | 707/102 |
| 2007/0288444 A1 * | 12/2007 | Nelken et al. | ..................... | 707/3 |
| 2008/0071708 A1 * | 3/2008 | Dara et al. | ..................... | 706/20 |
| 2009/0012841 A1 * | 1/2009 | Saft et al. | ........................ | 705/10 |
| 2009/0037458 A1 * | 2/2009 | Meyer et al. | .................. | 707/102 |
| 2009/0228774 A1 * | 9/2009 | Matheny et al. | .............. | 715/201 |
| 2009/0301198 A1 * | 12/2009 | Sohn et al. | ..................... | 73/598 |
| 2010/0082628 A1 * | 4/2010 | Scholz | .......................... | 707/740 |
| 2010/0121851 A1 * | 5/2010 | Kumaran | ..................... | 707/737 |
| 2010/0131509 A1 * | 5/2010 | Acharya | ....................... | 707/740 |
| 2010/0161609 A1 * | 6/2010 | Fogel | ............................. | 707/737 |
| 2010/0223265 A1 * | 9/2010 | Fogel | ............................. | 707/740 |
| 2011/0029519 A1 * | 2/2011 | Walther et al. | ................ | 707/737 |
| 2011/0055192 A1 * | 3/2011 | Tang et al. | ..................... | 707/706 |
| 2011/0196870 A1 * | 8/2011 | Schmidtler et al. | ........... | 707/737 |

* cited by examiner

*Primary Examiner* — Thanh-Ha Dang
(74) *Attorney, Agent, or Firm* — Scully, Scott, Murphy & Presser, P.C.; Daniel P. Morris, Esq.

(57) ABSTRACT

A system, method and computer program product provides a solution to a class of categorization problems using a semi-supervised clustering approach, the method employing performing a Soft Seeded k-means algorithm, which makes effective use of the side information provided by seeds with a wide range of confidence levels, even when they do not provide complete coverage of the pre-defined categories. The semi-supervised clustering is achieved through the introductions of a seed re-assignment penalty measure and model selection measure.

16 Claims, 3 Drawing Sheets

| CONF. | 0.8 | 0.7 | 0.6 | 0.5 | 0.4 | 0.3 | 0.2 | 0.1 |
|---|---|---|---|---|---|---|---|---|
| % OF TOTAL | 9 | 10 | 31 | 32 | 33 | 40 | 43 | 59 |
| COVERAGE | 1 | 2 | 4 | 5 | 5 | 7 | 7 | 7 |
| ACCURACY | 100 | 100 | 100 | 99 | 98 | 96 | 89 | 78 |

SYSTEM AND METHOD FOR ADAPTIVE CATEGORIZATION FOR USE WITH DYNAMIC TAXONOMIES

BACKGROUND

1. Field of the Invention

The invention relates generally to information systems, and more particularly, the invention relates to a novel categorization system and method for a clustering framework.

2. Description of the Related Art

With the explosion of data volumes and Internet usage, many everyday applications rely on some form of automated categorization to avoid information overload and improve user experience. While matching of objects to predefined categories can often be carried out via supervised classification, there are many cases where classification is difficult due to inability to generate training examples for all categories. This is particularly true in situations where the pre-defined categories are highly dynamic due to constantly evolving applications and user needs. This makes it impossible to rely on manual labeling or sample selection, as they would have to be conducted whenever the taxonomy changes.

It would thus be highly desirable to provide a system tool and methodology to facilitate many types of categorizing applications. For instance, those types of categorization involving: 1) a dataset with underlying basic features attached to every point (any features that can be computed for each sample point in the data set); 2) a set of categories, each accompanied with category descriptions (could be just descriptive names); and/or, 3) optional data descriptions generated independently of the category descriptions (e.g. outdated labels or labels assigned without predefined taxonomy in mind).

Note that this set of assumptions captures well the characteristics of many real world applications. For example, in a stock photo database, images are organized according to pre-defined categories, such as "Portraits" or "Macro", with corresponding descriptions. Selected image features can be computed for all photos in the collection, forming the basic feature set, while some photographers enter the description of their photos, which then represent optional data descriptions.

Another example, is in the area of business analytics, and relates to categorization problems often encountered in project management tools. Such tools are used to track projects according to a set of predefined categories aligned with products/services sold by the company, and compute business metrics that assess the quality of service. In order to obtain meaningful metrics, it is critical to ensure accurate assignment of projects into the pre-defined solution categories. However, because of the dynamic business environments and changing customer needs, the solution portfolios are constantly evolving and frequently redefined, limiting the ability of project managers to categorize projects accurately. Hence, there is a need for an automated methodology to assist with project categorization.

Moreover, while past research has proposed various methods to incorporate "constraint violation penalty" in clustering with pairwise constraints, these techniques are not used for cases using seeds with varying confidence levels in a k-means setting.

Thus, it would be highly desirable to provide a method for adaptive categorizing for use with partial textual descriptions and basic features in a constrained clustering framework.

SUMMARY OF THE INVENTION

The present invention addresses the needs described above by providing a solution to the categorization problem using a semi-supervised clustering technique.

In one embodiment, semi-supervised clustering technique implements text-based matching between category and data descriptions to generate "soft" seeds which are used to guide clustering in the basic feature space using a variation of the k-means algorithm referred to as Soft Seeded k-means.

Thus, according to the invention, a new metric for model selection is provided in situations where the seed coverage is incomplete (i.e., the seeds do not cover all categories), and a seed re-assignment penalty measure is incurred to effectively make use of the text matching results with varying degrees of confidence.

The invention formulates the categorization problem as a semi-supervised clustering one. Text-based matching between category and data descriptions is used to generate "soft" seeds, and guide clustering in the basic feature space using a new variation of the k-means algorithm called Soft Seeded k-means. A new metric is introduced for model selection in situations where the seed coverage is incomplete (i.e., the seeds do not cover all categories), and a seed re-assignment penalty measure to effectively make use of the text matching results with varying degrees of confidence.

In accordance with the invention, there is provided a system, computer-implemented method and computer program product for categorizing data points belonging to a dataset, each data point having a set of basic features associated therewith. The computer-implemented method comprises:

matching a textual description of a data point of the dataset to category descriptions relating to a pre-defined set of categories, for the data point having the textual description, generating a soft seed data structure based on a result of the matching; and, assigning each the data points into a predefined number of clusters corresponding to the pre-defined categories using the generated soft seed data structures and the set of basic features, the cluster assigning including using a semi-supervised clustering framework.

In one aspect of the invention, the assigning includes implementing a semi-supervised k-means algorithm.

In a further aspect of the invention, the soft seed data structure includes a label to one of the predefined categories, and a confidence score.

In a further aspect of the invention, the implementing the semi-supervised k-means algorithm comprises:

a) assigning an initial centroid to each predefined cluster, wherein, an initial centroid is computed based on seeds representing labeled data points, and for a cluster not covered by seeds, the initial centroid is computed based on random sampling from all unlabeled data points;

b) assigning each the data points to a cluster in a manner to minimize a distortion measure; the assigning performed by iterating over the set of data points, and at each iteration:

determining violation of a soft seeding constraint of a data point assigned to a cluster, and one of:

incurring a penalty value based on the confidence score, if violated; and, incurring no penalty if not violated; and, determining a cluster model for the assigned data points, and generating a fitness score based on the cluster model; and, performing steps a) and b) a plurality of iterations, and determining a cluster model and corresponding fitness score for the assigned data points at each iteration; and, selecting the cluster model corresponding to the highest fitness score as the final assignment of all data points to the predefined categories.

Further to this embodiment, in the computer-implemented method for categorizing data points, the distortion measure comprises a pairwise distance measure $D(x_i, \xi_j)$ between a data point $x_i$ of the data set and a calculated centroid $\xi_j$ of a particular cluster "j".

Further in the computer-implemented method, wherein at each iteration, further updating a centroid $\xi_j$ value for each cluster "j" to which a labeled or unlabled datapoint has been assigned.

Further in the computer-implemented method there is performed:

computing each initial centroid covered by seeds using the labeled datapoints having associated seeds; and, computing each initial centroids of remaining clusters through random sampling of unlabeled data points having no associated seeds.

Further in the computer-implemented method, wherein at each iteration of performing steps a) and b), computing the initial centroids of remaining clusters according to a different random sampling of unlabeled data points.

Moreover, in the computer-implemented method, the incurred penalty value comprises a value determined in accordance with a sigmoid function of the seed score.

In one embodiment, the incurred penalty P( ) is a sigmoid function of the seed score and is computed, at the computing device, according to:

P(j, li, si)=0 if j=0 or j=l$_i$; otherwise $$P(j, li, si) = \frac{\gamma}{1 + e^{(-\alpha(s_i - \beta))}}$$

having values in the range (0, γ), wherein the sigmoid function is a function having a middle point defined by β and the slope of the step controlled by α, and li comprising a seed label of an assigned data point to a cluster, and si is the seed confidence score for the data point $x_i$, and j is the cluster Xi is assigned to.

In a further embodiment, the fitness score is based on the cluster model according to:

$$(D_l * |D_l - D_{ul}|)^{-1}$$

where $D_l$ represents a distortion measure of the labeled data points, and $D_{ul}$ represents a distortion measure of the unlabeled data points.

In a further aspect of the invention there is provided a computer program product for categorizing data points belonging to a dataset, each data point having a set of basic features associated therewith. The computer program product comprises:

a computer usable medium having computer usable program code embodied therewith, the computer usable program code comprising:

computer usable program code configured to match a textual description of a data point of the dataset to category descriptions relating to a pre-defined set of categories, and, computer usable program code configured to generate, for the data point having the textual description, a soft seed data structure based on a result of the matching; and, computer usable program code configured to assign each data point into a predefined number of clusters corresponding to the pre-defined categories using the generated soft seed data structures and the set of basic features, the cluster assigning including using a semi-supervised clustering framework.

Advantageously, the present invention demonstrates the benefit of semi-supervised clustering using seeding in a real world application. Thus, while one approach described herein is in the context of the service product categorization problem, it can be easily applied to problems of similar nature in other domains.

BRIEF DESCRIPTION OF THE DRAWINGS

The objects, features and advantages of the invention are understood within the context of the Description of the Preferred Embodiment, as set forth below. The Description of the Preferred Embodiment is understood within the context of the accompanying drawings, which form a material part of this disclosure, wherein.

DETAILED DESCRIPTION OF THE PREFERRED EMBODIMENTS

Figure 1:
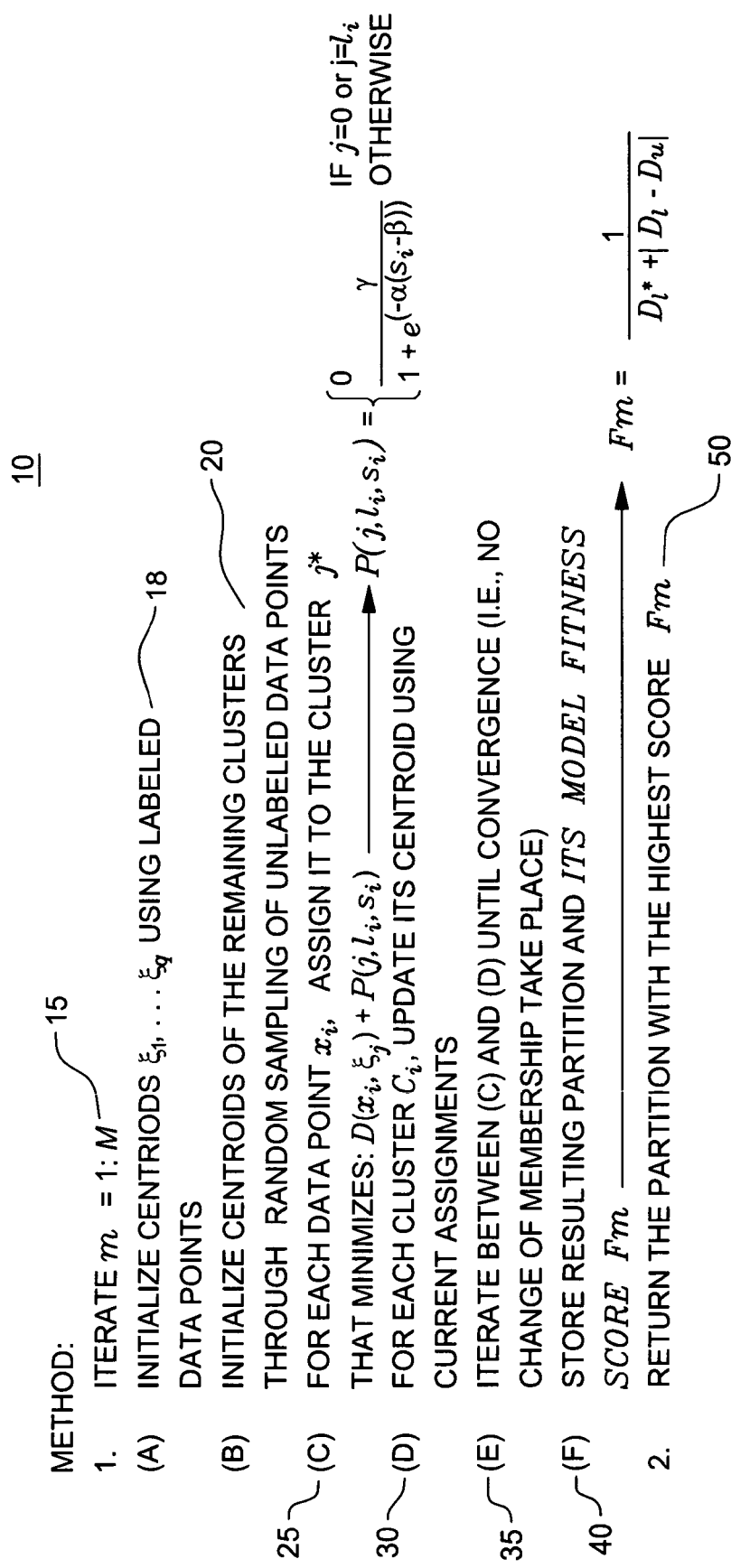
FIG. 1 shows a flow chart depicting the novel methodology for categorization using semi-supervised clustering of the present invention.

According to the invention, the categorization problem is formulated as a semi-supervised clustering one. Text-based matching between category and data descriptions is used to generate "soft" seeds, and guide clustering in the basic feature space using a new variation of the k-means algorithm called Soft Seeded k-means. A new metric is introduced for model selection in situations where the seed coverage is incomplete (i.e., the seeds do not cover all categories), and a seed re-assignment penalty measure is implemented to effectively make use of the text matching results with varying degrees of confidence.

In an example project categorization problem, each category is defined by a category name, along with category descriptions specifying the scope of the category. For example, a category could be "Server Product Services for Microsoft", and the description may include "MS Application Development and Integration Services", "MS Evaluation and Planning for On Demand", etc. In this example application, for each project, the basic features include a skill allocation vector computed based on the actual hours billed by practitioners of various skills. In addition, each project has an optional description field including free text descriptions specifying the nature of the project, typically entered by the project manager at the beginning of the project.

In a first step of the method of one inventive embodiment, available data descriptions (e.g., project descriptions) are matched against the category descriptions. For a subset of the data, this step produces a category label, along with a confidence score for each sample point.

In a second step, this set of labeled data along with the confidence scores is used as "soft" seeds in a semi supervised clustering algorithm, i.e., guide the clustering of the data set into predefined number of clusters. The labeled set is referred to as "soft" seeds for two reasons: 1) The labels are not viewed as hard constraints on cluster membership, but rather soft ones with varying degrees of strength tied to the confidence score; and, 2) The seeds do not necessarily provide complete coverage of all categories.

It is noted that, that in the latter case, semi-supervised clustering cannot be used to achieve completely automatic categorization (nor can any other learning scheme). However it still provides great value by reducing the amount of manual labeling required, since instead of having to label individual data points, one only needs to map the "uncovered" clusters to the "uncovered" categories. In one embodiment, a k-means type algorithm is implemented because it has been successfully used in a variety of application domains.

According to the invention, a Soft-Seeded k means algorithm is implemented that is most closely related to the Seeded k-means and Constrained k-means algorithms proposed by Basu et. al. in "Semi-supervised clustering by seeding", In *Proc. 19th ICML*, Sydney, Australia, July 2002. The differences are that in Seeded k-means and Constrained k-means the seeds are either used only for initialization, or treated as hard constraints. Furthermore, both algorithms assume that there is at least one seed for each cluster. The Soft-Seeded k means algorithm employed in the present invention treats the seeds as "soft" constraints through the introduction of a seed reassignment penalty, and allows incomplete coverage of clusters by seeds.

Seeds are generated on the basis of the similarity between the data (e.g., project) descriptions and the category descriptions. In one embodiment, this is measured using a standard TF*IDF (Term Frequency—Inverse Document Frequency) method as described in the reference to G. Salton and C. Buckley entitled "Term Weighting Approaches in Automatic Text Retrieval" (Technical Report 87-881)", Dept. of Computer Science, Cornell University, Ithaca, N.Y., USA, 1987, incorporated by reference herein. It is understood that other similarity measures may be implemented besides the TF*IDF similarity method. For each category, the category descriptions are first processed for punctuation removal, stop word removal and stemming, abbreviation expansion (e.g. VOIP is expanded to Voice over IP, IPT is expanded to IP Telephony, etc.) as well as domain specific term mapping (e.g., "AS400" is mapped to "iSeries", "System 390" is mapped to "zSeries", etc.). The resulting category descriptions are then tokenized into word-tokens using white space as delimiters. Finally, for each project description, the TF*IDF similarity score is computed between that project description and each of the category descriptions. The similarity score provides a measure of the confidence in the mapping, with identical strings having a score of 1 and totally different strings having a score of 0.

A seed set can then be generated based on a chosen threshold on the confidence score T. For each project, if the maximum confidence score is greater than T, then the category corresponding to that score is assigned to the project instance; otherwise, the project is not assigned to any category. The set of projects labeled in this way (along with the corresponding scores) provide the "soft seeds" for clustering. Clearly, the choice of threshold T determines the trade-off between the coverage and quality of the seed set: the higher the threshold, the "cleaner" the seed set, but the lower the coverage. As shown in the experiments later, when the seed labels are used as hard constraints the clustering outcome is highly sensitive to the selection of T. This sensitivity can be greatly reduced through the introduction of soft seeds.

FIG. 1 shows the methodology of the present invention. As shown in FIG. 1, the high level logical architecture 10 includes the provision of inputs including:
a Data set "X" where $X=\{x_1, x_2, x_3, \ldots x_n\}$, where $x_i$ are data points with $x_i \in R^d$ wherein $x_i$ is the feature vector (i.e., the basic features) representing a sample point to be categorized and, which, can be either a labeled (i.e., with label derived from text matching) or unlabeled point and $R^d$ is space made up of d dimensional real vectors;
a Seed label vector "L" where $L=\{l_1, l_2, l_3, \ldots l_n\}$ $l_i=0$ if $x_i$ is unlabeled and $l_i=j$, $j \in [1, \ldots, k]$ if $x_i$ is a seed assigned to cluster j; and,
a Seed score vector "S" where $S=\{s_1, s_2, s_3, \ldots s_n\}$, $s_i \in [0, 1]$, where $s_i=0$ if $x_i$ is not a seed; and,
"k" represents the total number of clusters; and
"q" represents the total number of clusters covered by seeds.
Without a loss of generality it is assumed for purposes of discussion that the first q clusters are covered.

Soft-Seeded K-Means

The Soft Seeded k-means algorithm 10 is summarized in FIG. 1. As shown at 15, an outer loop 15 is entered that iterates over M number of runs, i.e., Iterate m=1:M runs. As will be described, a number m runs are optimal, each run m having a different centroid initialization (e.g., random). As will be explained in greater detail, after each run m, a model fitness score is computed for each m, and a model selection process is performed only once after the M number of runs, e.g., when a partition corresponding to the highest model fitness score is chosen. Thus, at a first step 18 of each run m, the process initializes centroids $\xi_1, \ldots, \xi_q$, of each cluster using labeled data points. In the described embodiment, labeled points are the data points that have text descriptions attached to them (e.g., project descriptions). If a matching can be found between the text description of a data point and one of the category descriptions, then the point is labeled by that category, with a certain confidence level (determined by the matching score). The centroid of a cluster is the point with minimum distance to all data points assigned to the cluster. For the clusters which do have seeds (i.e., data points with preliminary labels derived from text matching), the centroid is computed based on these seeds. (For example, one way of computing it is by taking the mean of the seeds.) Then, at step 20, centroids of the remaining clusters are randomly initialized through random sampling of the unlabeled data points $x_i$. Then both labeled and unlabeled data points are adjusted through a k-means process, as in an unsupervised clustering algorithm, as follows:

At the next step 25 there is entered a first inner loop for assigning each data point $x_i$ to the cluster j* that minimizes a distortion measure $D(x_i, \xi_j)+P(j,l_i,s_i)$. Continuing to step 30, there is entered a second inner loop, such that, for each cluster $C_j$, its centroid is updated using current assignments comprising the data assigned to this category in the current iteration. The centroid is computed based on all these data points, i.e., the centroid needs to be determined, and updated for all clusters, not just those covered by seeds There are multiple ways to compute the centroid based on assigned data points— the present invention does not depend on using any specific one and in one example, is computed based on the mean. Then, as indicated at 35, the inner loops indicated at steps 25 and 30 are iterated until a convergence results (e.g., no change of membership takes place).

There are multiple ways of measuring convergence and the present invention is not limited to any one particular measure. No change of membership, is one way. Another way is to check the overall distortion whereby convergence is achieved when the decrease of overall distortion is smaller than a very low threshold. These are known concepts in the standard k-means algorithm, and which comprises a base of a new SS-k means algorithm.

Finally, as indicated at 40, the algorithm computes a resulting partition (for iteration m) and its model fitness score $F_m$.

That is, the algorithm comprises two nested loops: When the inner loop 25 (iterative process) converges, a partition, meaning assignment of all data points to the predefined categories, is reached, and the processor device or like computing device computes the model fitness score $F_m$. The score measures the quality of the partition. Since there is randomness involved in the initialization step 20, each particular run of this inner iterative process could produce a different partition. Hence, the outer loop is introduced to run this process M times.

In one embodiment, the model fitness score $$F_m = \frac{1}{D1^* |D1 - Du|}.$$

Finally, after iterating M times, the outer loop 15 ends and the system selects the partition with the highest model fitness score $F_m$. What is output 50 for selection is the partition that gives the best model fitness score (e.g., the final output).

As shown in FIG. 1, returning back to step 25, a first distortion measure term $D(x_i, \xi_j)$ is a pairwise distance measure defined over $R^d$. The pairwise distance measure depends on the application. In the example case of project categorization, it measures how different the skill distributions are between any to projects. For example, project A requires 80% project manager time, 20% application architect time, project B requires 50% project manager time, 50% application architect time, one way to define D(A,B) is: |0.8−0.5|+|0.2−0.5|=0.6).

Distortion measure term $P(j, l_i, s_i)$ includes the seed reassignment penalty measure defined as following:

$P(j, li, si)=0$ if $j=0$ or $j=l_1$; otherwise $$P(j, li, si) = \frac{\gamma}{1 + e^{(-\alpha(s_i - \beta))}}$$

In other words, it measures the amount of penalty incurred if a data point has been assigned to a category that's different from the preliminary seed label given. In one example, a function $$\left( \frac{\gamma}{1 + e^{(-\alpha(s_i - \beta))}} \right)$$

or like sigmoid function is used.

In other words, the penalty is 0 if a data point is either not a seed, or it is a seed assigned to the same cluster as indicated by the seed label. Otherwise, the soft seeding constraint is violated and the penalty incurred is a sigmoid function of the seed score $s_i$. The sigmoid implements a soft stepping function with values in the range $(0, \gamma)$. The middle point of the soft step is defined by $\beta$ and the slope of the step is controlled by $\alpha$. In one example embodiment, $\gamma$ equals the maximum pairwise distance, and a value for $\beta$ is the mean of the seed confidence scores. It is understood that the values for $\beta$, $\alpha$ and $\gamma$ are only one of the many alternatives. As in any k-mean style algorithm, the inner loop of the algorithm only converges to a local minimum, and thus depends heavily on centroid initialization.

For clusters covered by seeds, the initial centroids are estimated using the seeds. For the remaining clusters no such side knowledge exists, and users are faced with the same initialization challenge as in unsupervised k-means clustering. To achieve better initialization, multiple runs are performed with different random initializations, followed by model selection. However, an important question is how to define the model fitness score.

In unsupervised k-means, the model fitness score is simply the inverse of the overall distortion. However, in semi-supervised clustering, such a function is not suitable. Intuitively, in this setting the best partition is not necessarily the one with minimum overall distortion, but rather one that conforms best to the seed constraints while maintaining low overall distortion. Thus, in the methodology described herein, the fitness score is defined to be the inverse of $D_l^* |D_l - D_{ul}|$, where $D_l$ and $D_u$ are the overall distortion of the labeled and unlabeled data points, respectively. The first term favors small distortion over the labeled data points (indicating better conformity to seed constraints), while the second ensures that the distortion is small over the unlabeled data points as well. Empirical evidence shows that this fitness score leads to significantly better performance than one based on the overall distortion.

To indicate the benefit of the methodology employed for categorization using semi-supervised clustering according to the invention, there are now described results of an experiment conducted using real data collected including a data set containing 302 projects from a product line, belonging to 8 predefined categories. Each project is associated with a 67 dimensional skill allocation vector. The pairwise vector distance D(x, y) is computed using L1 norm. For the results reported, the parameters used to compute the seed reassignment penalty function P(j, li, si) are set to: $\alpha=2.0$, $\beta=0.4$, and $\gamma=10$. The number of random initializations M is set to 10.

Figures 2, 3:
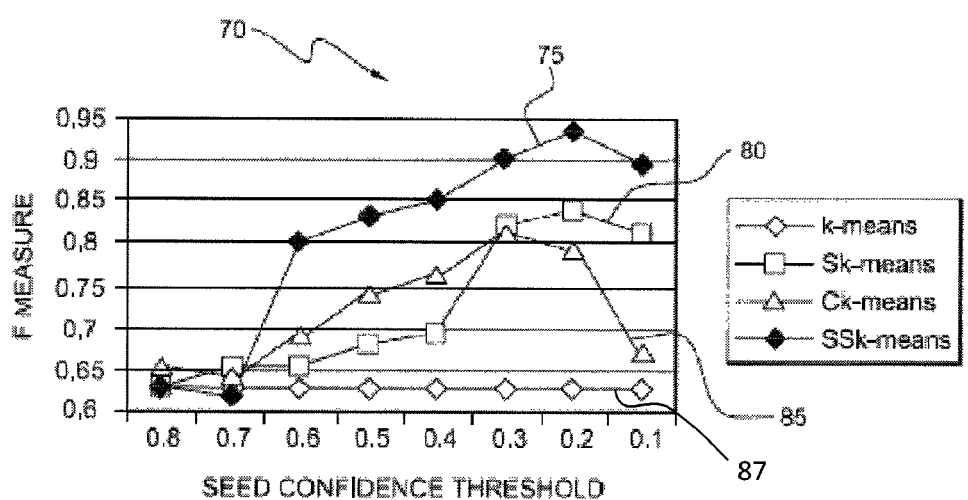
FIG. 2 is an table of example data showing coverage and accuracy of the different sets of seeds according to the different set thresholds in the method as employed in the present invention.
FIG. 3 is an example resulting plot depicting how the use of the soft seeded K-means algorithm outperforms use of different semi-supervised techniques; and, FIG. 4 depicts an exemplary computer system programmed to execute the methodology of the present invention.

In the experiment conducted, eight (8) different sets of seeds are generated by setting the threshold at levels equally spaced between 0.8 and 0.1, covering the range of all non-zero text matching scores on this data set. FIG. 2 is a table 60 showing the coverage and accuracy for different example sets of seeds. Note that in this example, while the threshold is set at the lowest level, the seeds still do not provide complete coverage of the clusters.

Following the seed generation step, the Soft-Seeded k-means algorithm (SSk-mean) implemented in the invention was run and results compared against techniques implementing standard k-means (k-means), Seeded k-means (Sk-means) and Constrained k-means (Ck means), for all seed sets. To evaluate the outcome of each clustering algorithm, a pairwise F measure such as described in the reference to M. Bilenko, et al. entitled "Integrating constraints and metric learning in semi-supervised clustering" in *Proc. 21st ICML*, Banff, Canada, 2004, was used. Each algorithm was run 10 times at each seed setting, and the average F-Measure is reported. For all algorithms the number of random initializations was set to 10. In the case of Seeded and Constrained k-means, since the original algorithm assumed complete coverage. In one application here random initialization can be used for the uncovered clusters, followed by standard model selection using overall distortion, which appears to be consistent with the setting used for the experiments reported.

Results 70 are shown in FIG. 3. As seen in the plot, the results of the Soft Seeded K-means algorithm implemented in the present invention 75 outperformed results of k-means 87, and outperformed both Seeded k-means 80 and Constrained k-means 85 implementations for all but the first two seed sets. For the first two sets, the seeds provide such a limited coverage (only up to 2 out of the 8 clusters) that none of the semi-supervised algorithms could benefit from them. In all semi-supervised clustering algorithms compared here one can observe, to different degrees, the trade-off between the benefit of including more seeds, thus incorporating more side knowledge, and the drawback of allowing more noise in the seeds. When the seed confidence levels are relatively high, resulting in high seed accuracies, the inclusion of more seeds improves the clustering performance. When the seed accuracy becomes much lower, the performance starts to decrease again. Constrained k-means outperforms Seeded k-means at high confidence levels, however its performance drops sharply as the seed accuracy gets below 95%. On the other hand, the Soft Seeded k-means implementation of the present invention achieves better performance at all levels. These results indicate that the soft seeding mechanism allows for the combination of the best characteristics of the previous algorithms—it is robust against seed noise while at the same time makes most effective use of the constraints introduced by the seeds.

Thus, the present invention provides a tool and methodology that facilitates "training sample free" categorization involving: 1) A dataset with underlying basic features attached to every point; 2) A set of categories, each accompanied with category descriptions (could be just descriptive names); and 3) Optional data descriptions generated independently of the category descriptions (e.g. outdated labels or labels assigned without predefined taxonomy in mind). For example: In project management tools, projects are tracked and business metrics are computed according to a set of predefined categories that are constantly evolving. Attributes such as hours claimed for each resource type form the basic features (an example metric may be percent of time spent on the project by a/each particular skill), while some project managers provide project descriptions that represent the optional data descriptions. In a further example: In a stock photo database, images are organized according to predefined categories, such as "Portraits" or "Macro", with corresponding descriptions. Selected image features (e.g., color or texture features of images) can be computed for all photos in the collection, forming the basic feature set, while some photographers enter the description of their photos, which then represent optional data descriptions.

The present invention can be realized in hardware, software, or a combination of hardware and software. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which, when loaded into a computer system, is able to carry out these methods.

Computer program means or computer program in the present context include any expression, in any language, code or notation, of a set of instructions intended to cause a system having an information processing capability to perform a particular function either directly or after conversion to another language, code or notation, and/or reproduction in a different material form.

Thus, the invention includes an article of manufacture which comprises a computer usable medium having computer readable program code means embodied therein for causing a function described above. The computer readable program code means in the article of manufacture comprises computer readable program code means for causing a computer to effect the steps of a method of this invention. Similarly, the present invention may be implemented as a computer program product comprising a computer usable medium having computer readable program code means embodied therein for causing a function described above. The computer readable program code means in the computer program product comprising computer readable program code means for causing a computer to effect one or more functions of this invention. Furthermore, the present invention may be implemented as a program storage device readable by machine, tangibly embodying a program of instructions executable by the machine to perform method steps for causing one or more functions of this invention.

The system and method of the present disclosure may be implemented and run on a general-purpose computer or computer system. The computer system may be any type of known or will be known systems and may typically include a processor, memory device, a storage device, input/output devices, internal buses, and/or a communications interface for communicating with other computer systems in conjunction with communication hardware and software, etc.

Figure 4:
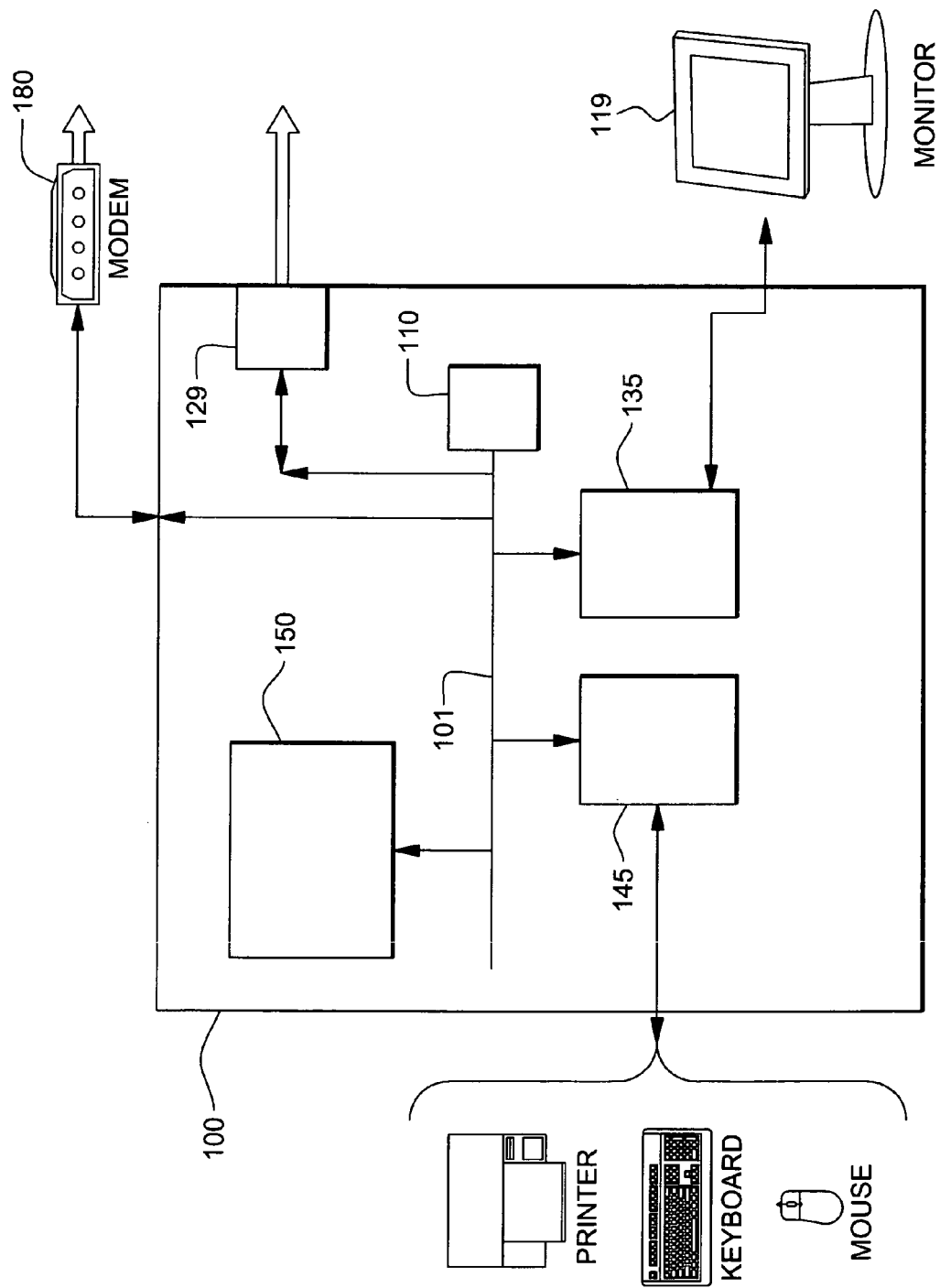

More specifically, as shown in FIG. 4, a computer system 100, includes one or more processors or processing units 110, a system memory 150, and an address/data bus structure 101 that connects various system components together. For instance, the bus 101 connects the processor 110 to the system memory 150. The bus 101 can be implemented using any kind of bus structure or combination of bus structures, including a memory bus or memory controller, a peripheral bus, an accelerated graphics port, and a processor or local bus using any of a variety of bus architectures such as ISA bus, an Enhanced ISA (EISA) bus, and a Peripheral Component Interconnects (PCI) bus or like bus device. Additionally, the computer system 100 includes one or more monitors 119 and, operator input devices such as a keyboard, and a pointing device (e.g., a "mouse") for entering commands and information into computer, data storage devices, and implements an operating system such as Linux, various Unix, Macintosh, MS Windows OS, or others.

The computing system 100 additionally includes: computer readable media, including a variety of types of volatile and non-volatile media, each of which can be removable or non-removable. For example, system memory 150 includes computer readable media in the form of volatile memory, such as random access memory (RAM), and non-volatile memory, such as read only memory (ROM). The ROM may include an input/output system (BIOS) that contains the basic routines that help to transfer information between elements within computer device 100, such as during start-up. The RAM component typically contains data and/or program modules in a form that can be quickly accessed by processing unit. Other kinds of computer storage media include a hard disk drive (not shown) for reading from and writing to a non-removable, non-volatile magnetic media, a magnetic disk drive for reading from and writing to a removable, non-volatile magnetic disk (e.g., a "floppy disk"), and an optical disk drive for reading from and/or writing to a removable, non-volatile optical disk such as a CD-ROM, DVD-ROM, or other optical media. Any hard disk drive, magnetic disk drive, and optical disk drive would be connected to the system bus 101 by one or more data media interfaces (not shown). Alternatively, the hard disk drive, magnetic disk drive, and optical disk drive can be connected to the system bus 101 by a SCSI interface (not shown), or other coupling mechanism. Although not shown, the computer 100 can include other types of computer readable media. Generally, the above-identified computer readable media provide non-volatile storage of computer readable instructions, data structures, program modules, and other data for use by computer 100. For instance, the readable media can store an operating system (O/S), one or more application programs, such as video editing client software applications, and/or other program modules and program data for enabling video editing operations via Graphical User Interface (GUI).

Input/output interfaces 145 are provided that couple the input devices to the processing unit 110. More generally, input devices can be coupled to the computer 100 through any kind of interface and bus structures, such as a parallel port, serial port, universal serial bus (USB) port, etc. The computer environment 100 also includes the display device 119 and a video adapter card 135 that couples the display device 119 to the bus 101. In addition to the display device 119, the computer environment 100 can include other output peripheral devices, such as speakers (not shown), a printer, etc. I/O interfaces 145 are used to couple these other output devices to the computer 100.

As mentioned, computer system 100 is adapted to operate in a networked environment using logical connections to one or more computers, such as the server device that may include all of the features discussed above with respect to computer device 100, or some subset thereof. It is understood that any type of network can be used to couple the computer system 100 with server device 120, such as a local area network (LAN), or a wide area network (WAN) (such as the Internet). When implemented in a LAN networking environment, the computer 100 connects to local network via a network interface or adapter 129. When implemented in a WAN networking environment, the computer 100 connects to the WAN via a high speed cable/dsl modem 180 or some other connection means. The cable/dsl modem 180 can be located internal or external to computer 100, and can be connected to the bus 101 via the I/O interfaces 145 or other appropriate coupling mechanism. Although not illustrated, the computing environment 100 can provide wireless communication functionality for connecting computer 100 with remote computing device, e.g., an application server 120 (e.g., via modulated radio signals, modulated infrared signals, etc.).

The terms "computer system" and "computer network" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, and server. A module may be a component of a device, software, program, or system that implements some "functionality", which can be embodied as software, hardware, firmware, electronic circuitry, etc.

While it is apparent that the invention herein disclosed is well calculated to fulfill the advantages stated above, it will be appreciated that numerous modifications and embodiments may be devised by those skilled in the art, and it is intended that the appended claims cover all such modifications and embodiments as fall within the true spirit and scope of the present invention.

What is claimed is:

1. A computer-implemented method for categorizing data points belonging to a data set, said method comprising:
   matching a textual description of a data point of said data set to category descriptions relating to one or more pre-defined set of categories;
   for said data point having said textual description, generating, using a processor device, one or more preliminary soft seed labels corresponding to one of the one or more pre-defined set of categories and corresponding seed score based on a result of said matching; and
   assigning each of said data points into a predefined number of clusters corresponding to the one or more predefined set of categories using the generated one or more preliminary soft seed labels, said cluster assigning using semi-supervised soft-seeded k-means clustering including;
   assigning an initial centroid to each predefined cluster, wherein, an initial centroid of a particular cluster is computed based on said one or more preliminary soft seed labels, and for a pre-defined cluster not covered by said soft seed labels, computing an initial centroid based on random sampling from all un-labeled data points;
   assigning each of labeled and said un-labeled data points to a cluster in a manner to minimize a distortion measure, said distortion measure including a seed re-assignment penalty value component as a function of said corresponding seed score, said seed re-assignment penalty value assessed upon determining a labeled or un-labeled data point assignment to a category different from the generated preliminary soft seed label;
   updating a centroid value for each said cluster to which a labeled or un-labeled data point has been assigned, and
   repeating said labeled or un-labeled data point assigning and centroid value updating until no re-assignment of soft seed labels to clusters of different categories occurs.

2. The computer-implemented method of claim 1, wherein said processor device further performs:
   determining a resulting cluster model for said assigned labeled and un-labeled data points, and generating a fitness score based on said resulting cluster model;
   repeating by said processor device, said cluster assigning of labeled and un-labeled data points and said centroid updating of said semi-supervised soft-seeded k-means clustering using different re-initialized centroid assignments at each of a plurality of iterations, and determining a resulting cluster model and corresponding fitness score for said assigned labeled and un-labeled data points at each iteration; and
   selecting the resulting cluster model corresponding to a highest fitness score as a final assignment of all data points to the predefined set of categories.

3. The computer-implemented method of claim 2, wherein said distortion measure comprises a pairwise distance measure $D(x_i, \xi_j)$ between a data point $x_i$ of the data set and a calculated centroid $\xi_j$ of a particular cluster "j".

4. The computer-implemented method of claim 2, further including:
   computing each initial centroid covered by seeds using the labeled data points having associated seeds; and
   computing each initial centroids of remaining clusters through random sampling of un-labeled data points having no associated seeds.

5. The computer-implemented method of claim 2, wherein at each of said plurality of iterations, computing each initial centroid of remaining clusters according to a different random sampling of un-labeled data points.

6. The computer-implemented method of claim 2, wherein said penalty value comprises a value determined in accordance with a sigmoid function P( ) of said seed score, said sigmoid function P( ) computed, at said computing device, according to:

P(j, li, si)=0 if j=0 or j=l$_i$; otherwise $$P(j, li, si) = \frac{\gamma}{1 + e^{(-\alpha(s_i - \beta))}}$$

having values in the range (0, γ), wherein said sigmoid function is a function having a middle point defined by β and the slope of the step controlled by α, and li comprising a seed label of an assigned data point to a cluster, and s$_i$ is said seed score for said data point x$_i$, and j is the cluster x$_i$ is assigned to.

7. The computer-implemented method of claim 2, wherein said fitness score is based on said cluster model according to:

$$(D_l * |D_l - D_{ul}|)^{-1}$$

where D$_l$ represents a distortion measure of the labeled data points, and D$_u$ represents a distortion measure of the un-labeled data points.

8. A computer program product for categorizing data points belonging to a data set, said computer program product comprising:
a non-transitory computer usable medium having computer usable program code embodied therewith, the computer usable program code comprising:
computer usable program code configured to match a textual description of a data point of said data set to category descriptions relating to one or more pre-defined set of categories;
computer usable program code configured to generate, for said data point having said textual description, one or more preliminary soft seed labels corresponding to one of the one or more pre-defined set of categories and corresponding seed score based on a result of said matching;
computer usable program code configured to assign each of said data points into a predefined number of clusters corresponding to the one or more predefined set of categories using the generated one or more preliminary soft seed labels, said cluster assigning using semi-supervised soft-seeded k-means clustering including;
assigning an initial centroid to each predefined cluster, wherein, an initial centroid of a particular cluster is computed based on said one or more preliminary soft seed labels, and for a pre-defined cluster not covered by said soft seed labels, computing an initial centroid based on random sampling from all un-labeled data points;
assigning each of labeled and said un-labeled data points to a cluster in a manner to minimize a distortion measure, said distortion measure including a seed re-assignment penalty value component as a function of said corresponding seed score, said seed re-assignment penalty value assessed upon determining a labeled or un-labeled data point assignment to a category different from the generated preliminary soft seed label;
updating a centroid value for each said cluster to which a labeled or un-labeled data point has been assigned, and
repeating said labeled or un-labeled data point assigning and centroid value updating until no re-assignment of soft seed labels to clusters of different categories occurs.

9. The computer program product of claim 8, further comprising:
computer usable program code configured to determine a resulting cluster model for said assigned labeled and un-labeled data points, and generating a fitness score based on said resulting cluster model;
computer usable program code configured for repeating said cluster assigning of labeled and un-labeled data points and said centroid updating of said semi-supervised soft-seeded k-means clustering using different re-initialized centroid assignments at each of a plurality of iterations, and determining a resulting cluster model and corresponding fitness score for said assigned labeled and un-labeled data points at each iteration; and
computer usable program code configured for selecting the resulting cluster model corresponding to a highest fitness score as a final assignment of all data points to the predefined set of categories.

10. The computer program product of claim 9, wherein said distortion measure comprises a pairwise distance measure D(x$_i$, ξ$_j$) between a data point x$_i$ of the data set and a calculated centroid ξ$_j$ of a particular cluster "j".

11. The computer program product of claim 9, further including:
computer usable program code configured to compute each initial centroid covered by seeds using the labeled data points having associated seeds; and
computer usable program code configured to compute each initial centroids of remaining clusters through random sampling of un-labeled data points having no associated seeds.

12. The computer program product of claim 9, wherein at each of said plurality of iterations, computer usable program code configured to compute the initial centroid further computes each initial centroid of remaining clusters according to a different random sampling of un-labeled data points.

13. The computer program product of claim 9, wherein said penalty value comprises a value determined in accordance with a sigmoid function P( ) of said seed score, said sigmoid function P( ) computed, at said computing device, according to:

P(j, li, si)=0 if j=0 or j=l$_i$; otherwise $$P(j, li, si) = \frac{\gamma}{1 + e^{(-\alpha(s_i - \beta))}}$$

having values in the range (0, γ), wherein said sigmoid function is a function having a middle point defined by β and the slope of the step controlled by α, and li comprising a seed label of an assigned data point to a cluster, and s$_i$ is said seed score for said data point x$_i$, and j is the cluster x$_i$ is assigned to.

14. The computer program product of claim 9, wherein said fitness score is based on said cluster model according to:

$$(D_l * |D_l - D_{ul}|)^{-1}$$

where D$_l$ represents a distortion measure of the labeled data points, and D$_u$ represents a distortion measure of the un-labeled data points.

15. A system for categorizing data points belonging to a data set comprising:
at least one processor; and
at least one memory device connected to the at least one processor, wherein the at least one processor is programmed to:

match a textual description of a data point of said data set to category descriptions relating to one or more pre-defined set of categories;

generate, for said data point having said textual description, one or more preliminary soft seed labels corresponding to one of the one or more pre-defined set of categories and corresponding seed score based on a result of said matching; and assign each of said data points into a predefined number of clusters corresponding to the one or more predefined set of categories using the generated preliminary soft seed labels, said cluster assigning using semi-supervised soft-seeded k-means clustering that:

assigns an initial centroid to each predefined cluster, wherein, an initial centroid of a particular cluster is computed based on said one or more preliminary soft seed labels, and for a pre-defined cluster not covered by said soft seed labels, computing an initial centroid based on random sampling from all un-labeled data points;

assigns each of labeled and said un-labeled data points to a cluster in a manner to minimize a distortion measure, said distortion measure including a seed re-assignment penalty value component as a function of said corresponding seed score, said seed re-assignment penalty value assessed upon determining a labeled or un-labeled data point assignment to a category different from the generated preliminary soft seed label;

updates a centroid value for each said cluster to which a labeled or un-labeled data point has been assigned, and repeats said labeled or un-labeled data point assigning and centroid value updating until no re-assignment of soft seed labels to clusters of different categories occurs.

16. The system of claim 15, wherein the at least one processor is further programmed to:

determine a resulting cluster model for said assigned labeled and un-labeled data points, and generating a fitness score based on said resulting cluster model;

repeat said cluster assigning of labeled and un-labeled data points and said centroid updating of said semi-supervised soft-seeded k-means clustering using different re-initialized centroid assignments at each of a plurality of iterations, and determining a resulting cluster model and corresponding fitness score for said assigned labeled and un-labeled data points at each iteration; and select the resulting cluster model corresponding to a highest fitness score as a final assignment of all data points to the predefined set of categories.

* * * * *